No. 789,284. PATENTED MAY 9, 1905.
J. W. LITTLE.
COMBINED COTTON SEED AND CORN PLANTER.
APPLICATION FILED OCT. 9, 1903.
2 SHEETS—SHEET 1.
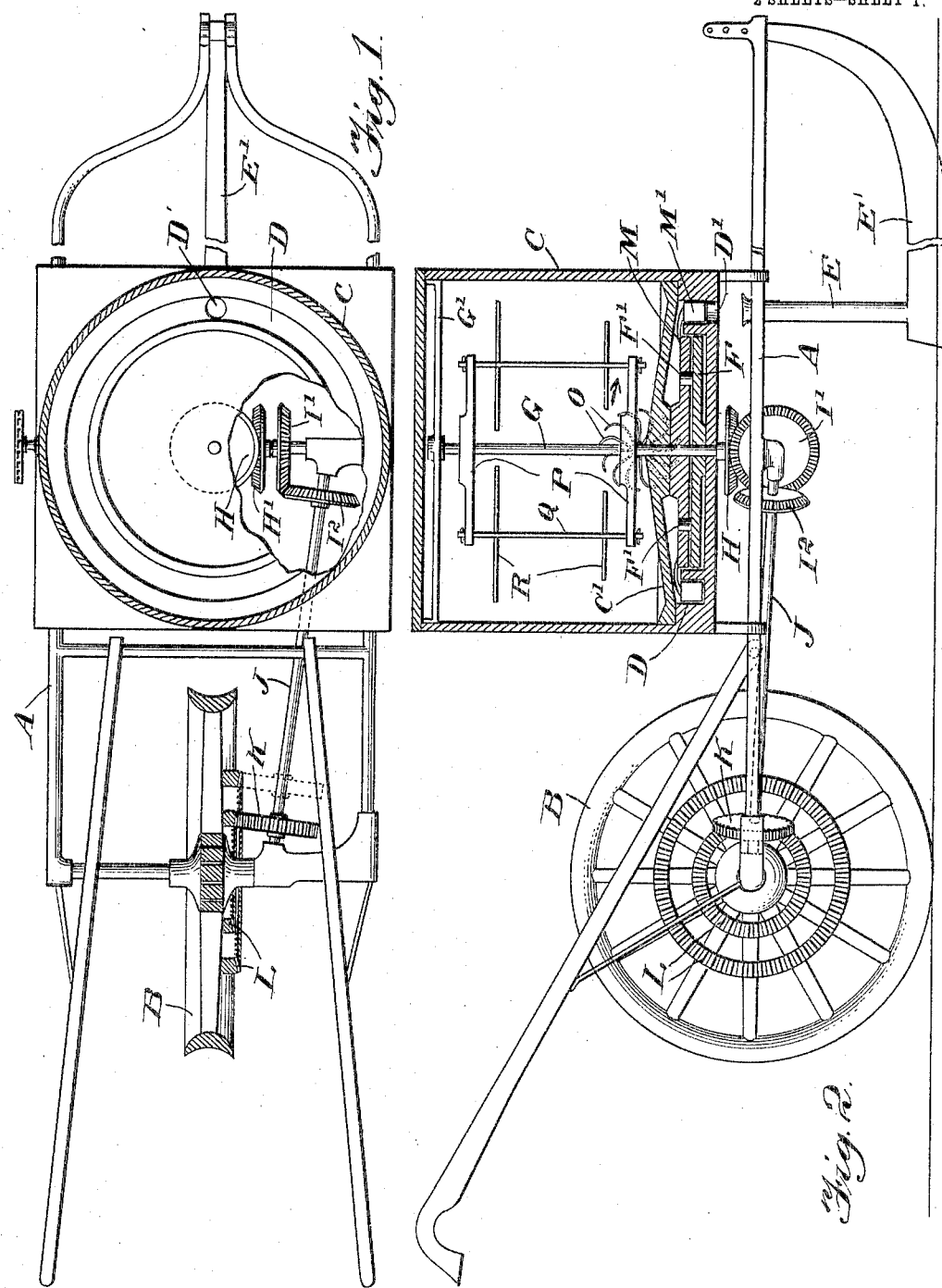
Witnesses:
H. B. Hallock
L. H. Morrison
Inventor:
Joseph W. Little,
By W. Taylor Atkinson
Atty.

No. 789,284. PATENTED MAY 9, 1905.
J. W. LITTLE.
COMBINED COTTON SEED AND CORN PLANTER.
APPLICATION FILED OCT. 9, 1903.

2 SHEETS—SHEET 2.

Witnesses:
H. B. Hallock,
L. H. Morrison.

Inventor:
Joseph W. Little,
By _____
Atty.

No. 789,284.

Patented May 9, 1905.

UNITED STATES PATENT OFFICE.

JOSEPH W. LITTLE, OF BURLINGTON, IOWA.

COMBINED COTTON-SEED AND CORN PLANTER.

SPECIFICATION forming part of Letters Patent No. 789,284, dated May 9, 1905.

Application filed October 9, 1903. Serial No. 176,394.

*To all whom it may concern:*

Be it known that I, JOSEPH W. LITTLE, a citizen of the United States, residing at Burlington, county of Des Moines, and State of Iowa, have invented a certain new and useful Improvement in a Combined Cotton-Seed and Corn Planter, of which the following is a specification.

My invention relates to a new and useful improvement in seed-planters, and has for its object to provide an extremely simple machine which will plant seed in hills at an equal distance apart and will plant the same amount of seed in each hill, and the distance between the hills may be varied by simply removing one plate and substituting another.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 3:
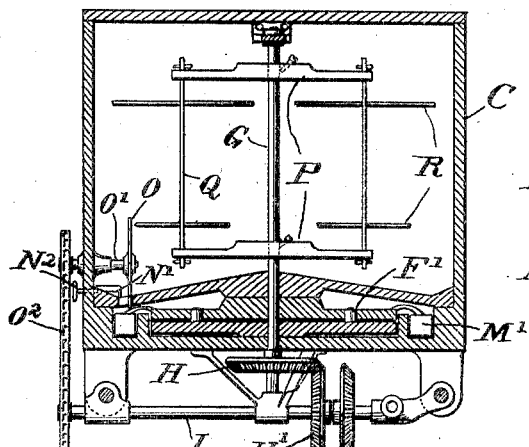
Figure 4:
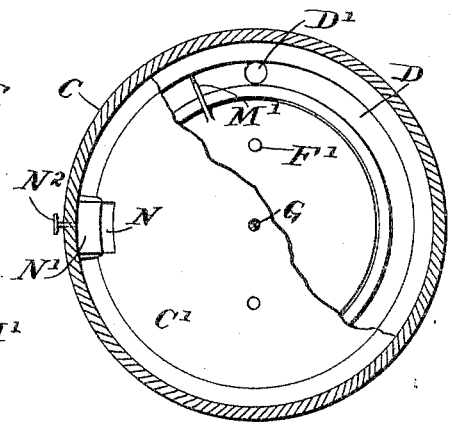
Figure 5:
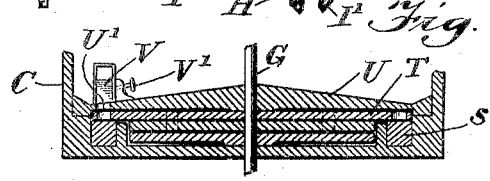
Figure 8:
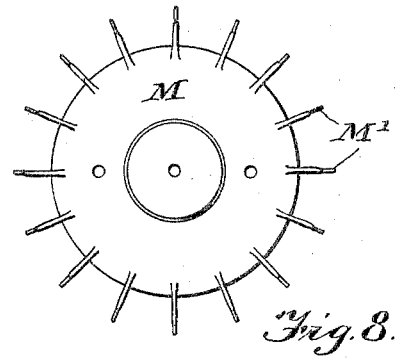
Figure 6:
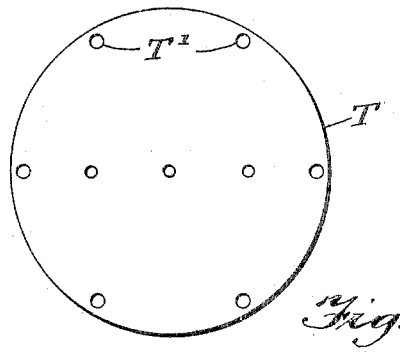
Figure 9:
Figure 7:
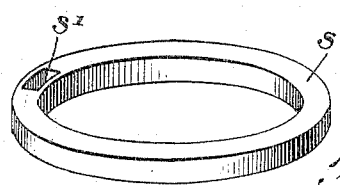
Figure 10:
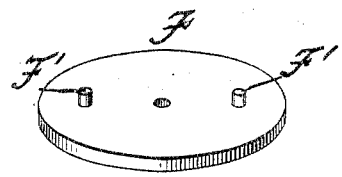

Figure 1 is a horizontal section through the hopper and through the covering-wheel; Fig. 2, a longitudinal section through the machine; Fig. 3, a cross vertical section through the hopper and mechanism connected thereto; Fig. 4, a horizontal section through the hopper, a portion of the bottom of the hopper being broken away to show the plate underneath; Fig. 5, a vertical section through the lower portion of the hopper, showing a modified form of construction; Fig. 6, a plan view of the feed-plate used in the construction shown in Fig. 5; Fig. 7, a perspective view of the ring adapted to fit in the annular channel when the construction shown in Fig. 5 is used. Fig. 8 is a plan view of the feed-plate used in the construction shown in Fig. 1; Fig. 9, a cross-section through Fig. 8; Fig. 10, a perspective view of the plate which actuates the feed-plate.

In the construction shown, of any suitable shape or design desired, B is the covering-wheel at the rear of the machine, which also acts as a traction-wheel for operating the mechanism.

C is the hopper adapted to contain the seed. In the base of the hopper is provided an annular channel D, which opens upward. D' is an opening extending downward from this channel and is directly above the feed-tube E, which extends downward to the shoe or furrow-opener E', so that the seed may be dropped in the furrow made by the shoe.

F is a plate adapted to revolve in the circular cavity in the base of the hopper, and this plate is keyed to an upright central shaft G, which extends upward, and the upper end is journaled in the cross-piece G', secured upon the interior of the hopper. The lower end of the shaft G extends downward through the bottom of the hopper and is there provided with a bevel-wheel H, which meshes with a bevel-wheel H', secured upon a lateral shaft I, and this shaft has also secured upon the same the beveled wheel I', which meshes with a bevel-wheel I², secured upon a shaft J, which extends rearward, and at the rearward end of the shaft a miter-gear K is secured upon the shaft J.

The covering-wheel is provided with two or more rows of miter-gears L, and the gear K may be loosened upon the shaft J and moved from one miter-gear L to another to increase or diminish the speed of the operating mechanism in the hopper.

The plate F is provided with two pins F', which are adapted to fit within corresponding openings formed in the feed-plates M, so that different feed-plates can be easily inserted by simply dropping them upon the pins. These feed-plates are adapted to be so driven as to drop the seed faster or slower, so as to make the hills come nearer together or farther apart.

When planting cotton, the machine is arranged as shown in Figs. 1, 2, and 3, and the feed-plate M (see Fig. 4) is provided with a number of wings or paddles M', which are adapted to revolve within the annular groove D. Above this feed-plate is fitted the removable bottom C' of the hopper, and through this bottom is formed an opening N, which is one-quarter of the circle removed from the opening D' through the bottom of the hopper. The seed will drop through the opening N into the annular channel D and be carried by the paddles M' around to the opening D', where the seed will drop into the feed-tube E. Thus it will be seen that if a less number of paddles are provided upon the feed-plate the hills will be a greater distance apart, and the more paddles on the plate the closer the hills will be together. In order to increase or diminish the size of the opening N, so as to provide for a greater or less amount of seed to pass through, I provide the sliding plate N' or cut-off, which may be operated by a screw $N^2$, threaded through the side of the hopper. In order to insure that the seed passes freely through the opening N and also in order to force the same into the channel D, I provide the wheel O, which revolves upon a shaft O', journaled in suitable bearings in the hopper and operated by a sprocket-chain $O^2$, which passes around a sprocket-wheel secured on the outer end of the shaft I. This wheel O is composed of a series of arms curved at their outer ends, as shown in Fig. 2, and adapted to revolve in the direction of the arrow in Fig. 2, and this wheel extends down through the opening N, but clears the paddles.

In order to keep the seed agitated, so that the same will not clog in the hopper, I provide the two arms P, which are removably secured to the shaft G, and the outer ends of these arms are connected together by the upright rods or shafts Q, and these shafts have secured thereto the arms R, which revolve within the seed as the arms P revolve with the shaft G and keep the seed constantly agitated.

In Figs. 5, 6, and 7 I have shown a modified form of construction in which the agitating apparatus is removed from the shaft G. The bottom C' of the hopper is removed and also the feed-plate M and the annular channel is filled by a ring S, which ring is solid except for an opening S', which registers with the opening D', formed through the bottom of the hopper. A feed-plate T, such as shown in Fig. 6, is then dropped upon the pins F' of the plate F, and the periphery of this feed-plate revolves above and in close contact with the ring S, and a number of openings T' are formed through the feed-plate, and the number of these openings is varied according to whether it is desired to plant the hills of seed a greater or less distance apart. Another bottom for the hopper (lettered U) is then arranged in place, and this bottom is provided with an opening U', arranged in the same place as the opening N of the other bottom described. It will then be seen that the seed will drop through the opening U' and lie upon the upper surface of the plate T until one of the openings T' comes in register with the opening U', when the seed will drop in this opening T' and then rest upon the upper surface of the ring S and be carried around until the opening T', containing the seed, registers with the opening S', when the seed will drop to the feed-tube. V is a vertically-sliding steel plate, the lower edge of which is adapted to come in close contact through the opening U' with the plate T, and thus prevent the seed from being carried between the plate T and the bottom U. A set-screw V' holds this plate V in place.

Of course I do not wish to be limited to the exact construction here shown, as slight modifications could be made without departing from the spirit of my invention.

Having thus fully described my invention, what I claim as new and useful is—

1. In a seed-planter, a suitable framework, a feed-tube depending from the framework, a covering-wheel arranged at the rear of the machine directly behind the feed-tube, a seed-hopper, a vertical shaft extending upward through the hopper, mechanism for communicating power from the covering-wheel to this vertical shaft, means for varying the speed of said shaft, an annular channel opening upward formed in the base of the hopper, a feed-plate removably secured to the shaft, the annular channel provided with an opening extending through the bottom of the hopper directly above the feed-tube, a removable bottom to the hopper arranged above the feed-plate, said bottom being provided with an opening directly above the annular channel but out of register with the opening connecting with the feed-tube, said feed-plate adapted to carry the seed flowing through the bottom into the channel around to the opening above the feed-tube, and an agitator secured to the central shaft and operating within the hopper, as and for the purpose specified.

2. In a seed-planter, a frame, a feed-tube depending from the frame, a covering-wheel located at the rear of the machine behind the feed-tube, a series of miter-gears secured to the side of the covering-wheel, a hopper, a vertical shaft extending upward through the hopper, a beveled gear secured upon the lower end of the vertical shaft, a transverse shaft, a beveled gear secured upon the transverse shaft and meshing with the beveled gear upon the upright shaft, a rearwardly-extending shaft, a miter-gear movably secured upon the rearwardly-extending shaft and adapted to mesh with one of the miter-gears upon the covering-wheel, beveled wheels connecting the rearwardly-extending shaft with the transverse shaft, a feed-plate arranged in the bottom of the hopper, the hopper being provided with an opening through the bottom directly over the feed-tube, the feed-plate provided with pockets opening through the same, a movable bottom in the hopper, an opening provided through the bottom out of register with the opening over the feed-tube, the seed adapted to pass through the opening in the bottom and be carried to the opening above the feed-tube by the feed-plate, as specified.

In testimony whereof I have hereunto affixed my signature in the presence of two subscribing witnesses.

JOSEPH W. LITTLE.

Witnesses:
JOHN L. PORRER,
T. G. HARPER.